Patented Aug. 28, 1934

1,971,951

UNITED STATES PATENT OFFICE 1,971,951

PRODUCT DERIVED FROM VINYL ESTERS AND PROCESS OF MAKING SAME

Frederick W. Skirrow and George O. Morrison, Shawinigan Falls, Quebec, Canada, assignors to Canadian Electro Products Company, Limited, Montreal, Quebec, Canada No Drawing. Application March 25, 1929, Serial No. 349,893

5 Claims. (Cl. 260—2)

This invention relates to gummy or resinous products derived from vinyl esters and to the manufacture thereof, and the object of the invention is to provide for the manufacture of such new and useful products.

It is well known that vinyl esters may be polymerized and there is disclosed in prior applications, Serial No. 147,183, filed November 8th, 1926, and Serial No. 213,208, file.. August 15th, 1927, the fact that aliphatic vinyl esters may be reacted with saturated aliphatic aldehydes in a wide range of proportions varying from less than one part to more than one hundred parts of aldehyde to one hundred parts of ester, with or without catalysts, under a great variety of conditions as to temperature, pressure, etc., to yield gummy products varying from hard, horny solids to liquids, according as more aldehyde is used.

We have discovered that the polymerization products and the aldehyde reaction products of vinyl esters may be hydrolyzed by treatment with aqueous solutions of mineral acids, especially hydrochloric acid. The hydrolysis may be partial or practically complete depending upon the temperature, concentration of acid and the duration of the treatment.

The partly hydrolyzed and the completely hydrolyzed ester polymerization and ester-aldehyde reaction products are different from one another in varying degrees according to the extent of hydrolysis and are also quite different from the polymerization and the aldehyde reaction products from which they are made. For instance, partial hydrolysis of the ester-aldehyde gums increases the emulsification capacity of the gums so that a partially hydrolyzed emulsified gum will be as soft as an unhydrolyzed emulsified gum made with a larger proportion of aldehyde. Again, unhydrolyzed or only slightly hydrolyzed gums are practically water-insoluble, whereas extensively or completely hydrolyzed gums are water soluble. Also, hydrolyzed, unemulsified gums are in some instances harder than unhydrolyzed, unemulsified gums. The partially hydrolyzed and completely hydrolyzed gums further differ from one another and from the unhydrolyzed gums in other respects, such as solubility, softening temperature, capability of reacting with other materials, etc. The hydrolysis may be effected with either emulsified or unemulsified gums.

In order to secure better contact between the mineral acid and the gums, it is preferred to carry out the hydrolysis in presence of suitable solvents, such as acetone, ethyl alcohol, butyl alcohol, and for commercial purposes it is preferable to use an alcohol, as in this way the major portion of the acid produced by hydrolysis is recoverable as the ester. Hydrolysis, however, can be carried out in aqueous medium.

The following examples will serve to indicate some comparative results but it will be understood that the invention is not confined to the materials, times, proportions and temperatures given, either in connection with vinyl acetate-acetaldehyde gums or with other ester-aldehyde gums, as these times, proportions and temperatures may be greatly varied.

Example I 200 parts of dry gum, prepared by reacting 2.4 parts acetaldehyde with 100 parts vinyl acetate, is placed in a reaction vessel and 340 parts of butyl alcohol added, together with 2 parts of concentrated hydrochloric acid and 8.5 parts of water. The material is then heated under a reflux condenser for a period of ten hours. Hydrolysis amounts to 43% as measured by the amount of acetic acid liberated. The product may be recovered by removal of the butyl alcohol, butyl acetate, acid and water by distillation, or other means.

Example II 20 parts of dry gum, prepared by reacting 12 parts acetaldehyde with 100 parts vinyl acetate, is placed in a reaction vessel and 100 parts of one-quarter normal hydrochloric acid added. The material is heated under a reflux condenser for a period of five hours. Hydrolysis amounts to 77%. The resultant product, which is quite water-soluble, may be recovered as in Example I by the removal of the water and acid by distillation or other means.

Example III 25 parts of dry gum, prepared by reacting 4.2 parts acetaldehyde with 100 parts vinyl acetate, is placed in a suitable reaction vessel and to this is added 250 parts of one-quarter normal sulphuric acid. After boiling under a reflux condenser for a period of 4½ hours 11% hydrolysis results; and after 23½ hours, 93% hydrolysis. The resultant product is water-soluble, due to the extensive replacement of acetyl groups with hydroxyl groups. The sulphuric acid may be removed by neutralization or precipitation or by other suitable means.

Example IV 20 parts of dry gum, prepared by reacting 30 parts acetaldehyde with 100 parts vinyl acetate, is placed in a suitable reaction vessel and 100 parts of one-half normal hydrochloric acid solution is added. After boiling under a reflux condenser for a period of five hours the product is hydrolyzed to the extent of 55%. The resultant product is isolated as previously.

Example V 34 parts of dry gum, obtained by reacting 5 parts acetaldehyde with 100 parts vinyl acetate, is dissolved in 80 parts of acetone. To this is added 10 parts of water containing .25 part of concentrated hydrochloric acid. The product is now bombed in a closed vessel at 100° C. for a period of 16 hours. The resultant product is isolated as previously and is found to have been hydrolyzed to the extent of 82%.

Example VI 100 parts of polymerized vinyl acetate is dissolved in 200 parts commercial acetone. To this is added 30 parts of water and 1.8 parts of concentrated hydrochloric acid. The material is then placed in a closed vessel and heated at 100° C. After a period of three hours the resultant product is 22% hydrolyzed, and after ten hours it is 36% hydrolyzed. The product may be recovered as previously.

Example VII 20 parts of dry polymerized vinyl acetate is placed in a suitable reaction vessel and 40 parts of water and .25 part concentrated hydrochloric acid added. After heating for 15 hours at 100° C. the material is found to be hydrolyzed to the extent of 86% and may be recovered as previously.

In all the foregoing examples, complete hydrolysis results if sufficient water is present and the treatment continued for a sufficient length of time.

From the foregoing disclosure it may be seen that polymerized vinyl esters and materials made by the treatment of vinyl esters with saturated aliphatic aldehydes may be hydrolyzed by treatment with dilute mineral acids, particularly hydrochloric acid. The use of other mineral acids, such as sulphuric acid and phosphoric acid, is not so suitable as the reaction is less rapid, and furthermore, being non-volatile they are more difficult of removal.

Furthermore, the process is applicable not only to polymerized vinyl acetate but to other polymerized vinyl esters, such as vinyl butyrate, vinyl propionate, etc. Also with regard to the vinyl ester-aldehyde reaction products, the process is applicable to any product resulting from the reaction of a vinyl ester with any saturated aliphatic aldehyde, the properties of the resultant product, of course, being dependent upon the percentage hydrolysis and the ester-aldehyde mixture used in making the parent product.

With reference to the physical properties of the bodies formed, it may be mentioned that those with low hydrolysis partake to a large degree of the properties of the parent material, but when they are emulsified with water, for example, a larger amount is taken up and thus they are softer in this condition than the parent gum, also less tough and less rubbery. Certain of these may be utilized as substitutes for chicle.

The materials having a higher percentage hydrolysis naturally partake to a greater extent of the properties of the corresponding poly-vinyl alcohols—this particularly in the case when polymerized vinyl esters are utilized. In the case of hydrolyzation products of the vinyl ester-aldehyde products, the higher hydrolyzation products partake more of the properties of certain poly-vinyl alcohols hitherto unknown, the molecular weight of the parent gum depending upon the amount of aldehyde used in its formation, this increasing as the percentage aldehyde is decreased.

Having thus described our invention, what we claim is:—

1. A process of making gummy products which comprises partially hydrolyzing a vinyl ester polymer by heating with a mineral acid and water.

2. A process of making gummy products which comprises partially hydrolyzing a vinyl ester polymer by heating with hydrochloric acid and water.

3. A process of making gummy products which comprises partially hydrolyzing polymerized vinyl acetate by heating with a mineral acid and water.

4. A process of making gummy products which comprises partially hydrolyzing polymerized vinyl acetate by heating with hydrochloric acid and water.

5. A gummy product being a partially hydrolyzed vinyl ester polymer.

FREDERICK W. SKIRROW.
GEORGE O. MORRISON.